United States Patent [19]

Grande

[11] Patent Number: 5,748,471

[45] Date of Patent: May 5, 1998

[54] WELL COLLAR IDENTIFICATION METHOD

[75] Inventor: René Shoan Grande, Red Deer, Canada

[73] Assignee: Otatco, Inc., Calgary, Canada

[21] Appl. No.: 626,255

[22] Filed: Mar. 29, 1996

[51] Int. Cl.⁶ .................................................. G06F 19/00
[52] U.S. Cl. ......................................................... 364/422
[58] Field of Search ............................ 364/422; 367/33, 367/27, 99, 107, 108, 113, 908; 33/302, 303, 306; 181/113, 124; 73/152.01

[56] References Cited

U.S. PATENT DOCUMENTS

| | | | |
|---|---|---|---|
| 2,232,476 | 2/1941 | Ritzmann | 181/5 |
| 4,318,298 | 3/1982 | Godbey et al. | 73/155 |
| 4,318,674 | 3/1982 | Godbey et al. | 417/36 |
| 4,793,178 | 12/1988 | Ahem et al. | 73/151 |
| 4,853,901 | 8/1989 | Barber | 367/27 |
| 5,200,894 | 4/1993 | McCoy et al. | 364/422 |

OTHER PUBLICATIONS

*Related Positive Time–Frequency Energy Distributions*, by Dorize, C. and Gram–Hansen, K., Wavelets and Applications, Meyer, Y. Ed. Proceedings of the Int'l Conf., Marseille, France, May, 1989.

*Wavelet Maxima Representation*, by Mallat, S. and Zhong, S., Wavelets and Applications, Meyer, Y. Ed. Proceedings of the Int'l Conf., Marseille France, May, 1989.

Orthonormal Bases of Compactly Supported Wavelets, Comm. Pure Appl. Math., vol. 41, 1988, pp. 906–966 by Ingrid Daubechies.

A Theory for Multiresolution Signal Decomposition: The Wavelet Representation, IEEE Transactions on Pattern Analysis and Machine Intelligence, vol. II, Nov. 7, pp. 674–693, Jul., 1989, by Stephane Mallat.

*Primary Examiner*—Donald E. McElheny, Jr.
*Attorney, Agent, or Firm*—Sheridan Ross P.C.

[57] ABSTRACT

A well collar counting methodology is provided comprising first obtaining acoustic pulse data from a well and then digitizing and storing the amplitude-versus-time signal for subsequent processing. The raw signal is processed by applying a Wavelet Transform thereto for producing multiple resolutions of the signal, preferably four, at least one of which has a transformed signal resolution sufficient to distinguish reflections emanating from collars, and one of the coarser resolutions having a transformed signal resolution sufficient to distinguish reflections emanating from the fluid surface as kicks. The fluid surface kick and repeat kicks are determined by performing multi-resolutional analysis of each maximum, at the coarser resolution, as synchronized against the successively finer resolutions and compared as being significant with respect to adjacent maximums. Tubing collars are then counted at a finer resolution, as being reflection maximums counted in the interval between the wellhead and the kick, irrespective of tubing joint length or collar frequency. Direct collar counting, interpolation and extrapolation of collars is performed.

16 Claims, 8 Drawing Sheets

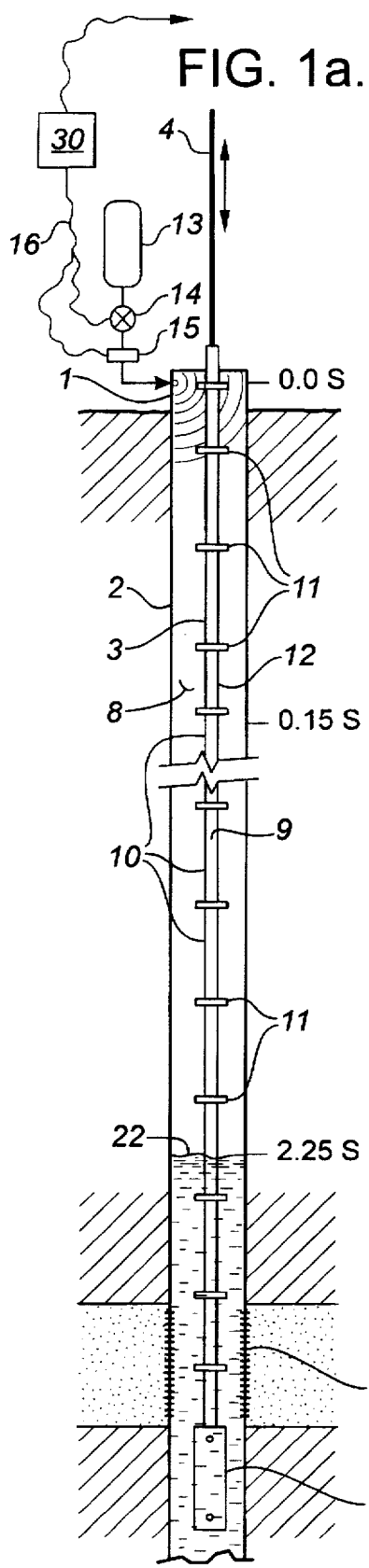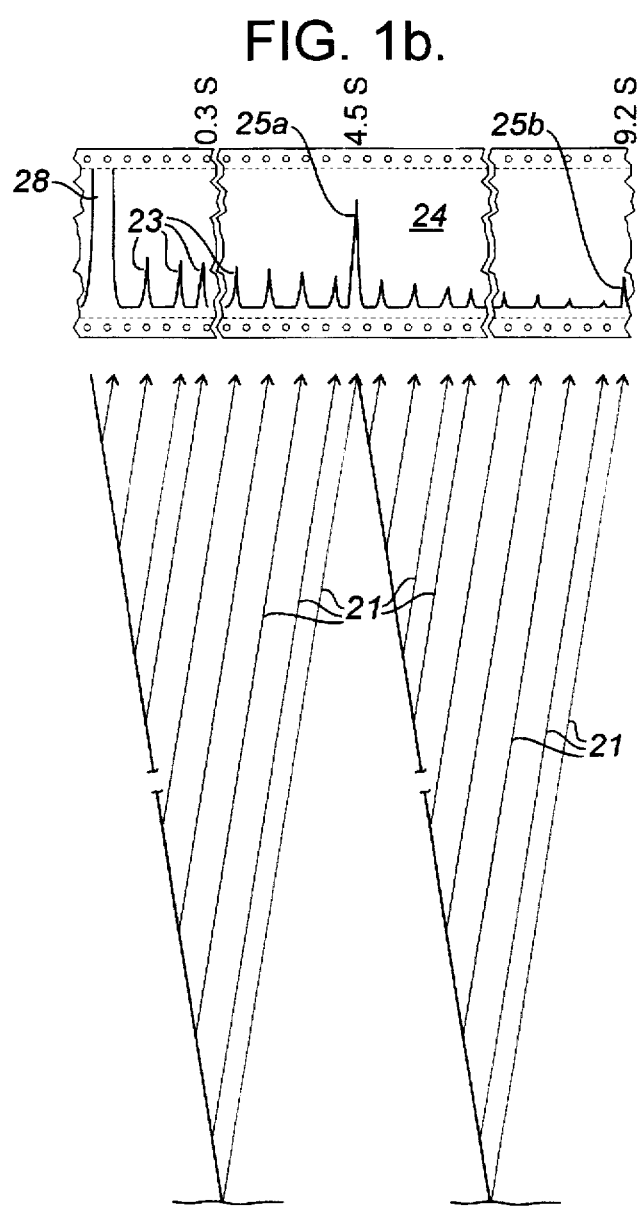

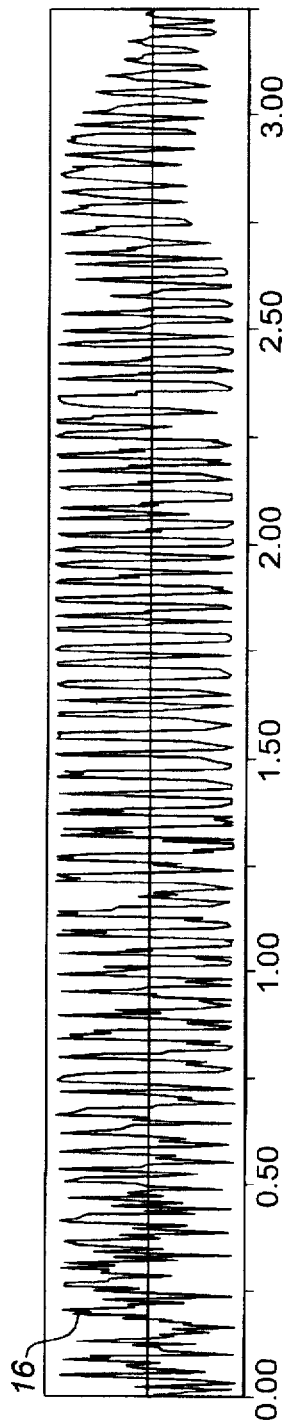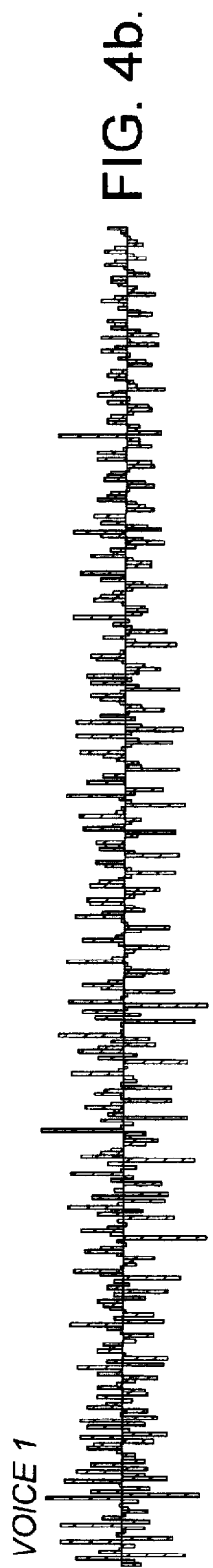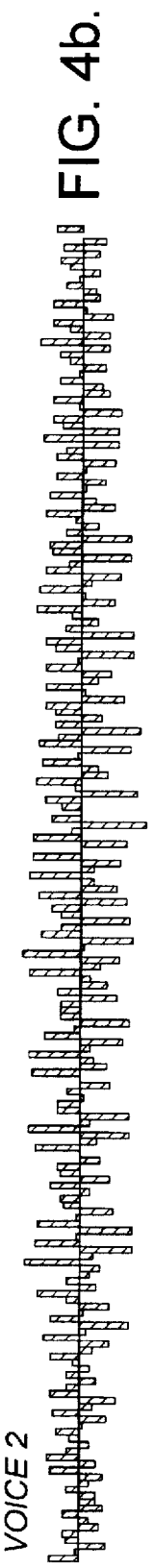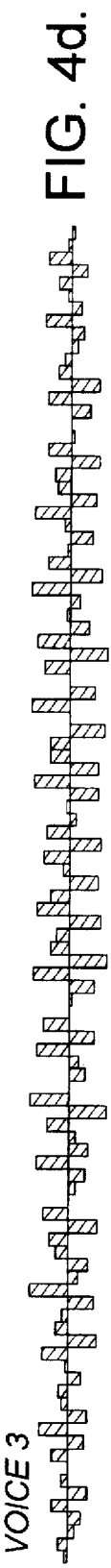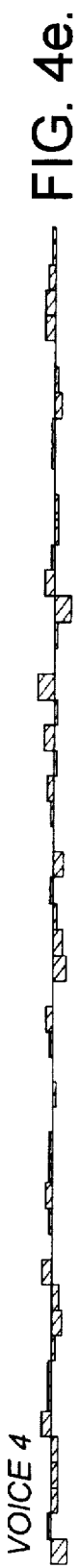
FIG. 4a. FIG. 4b. FIG. 4b. FIG. 4d. FIG. 4e.

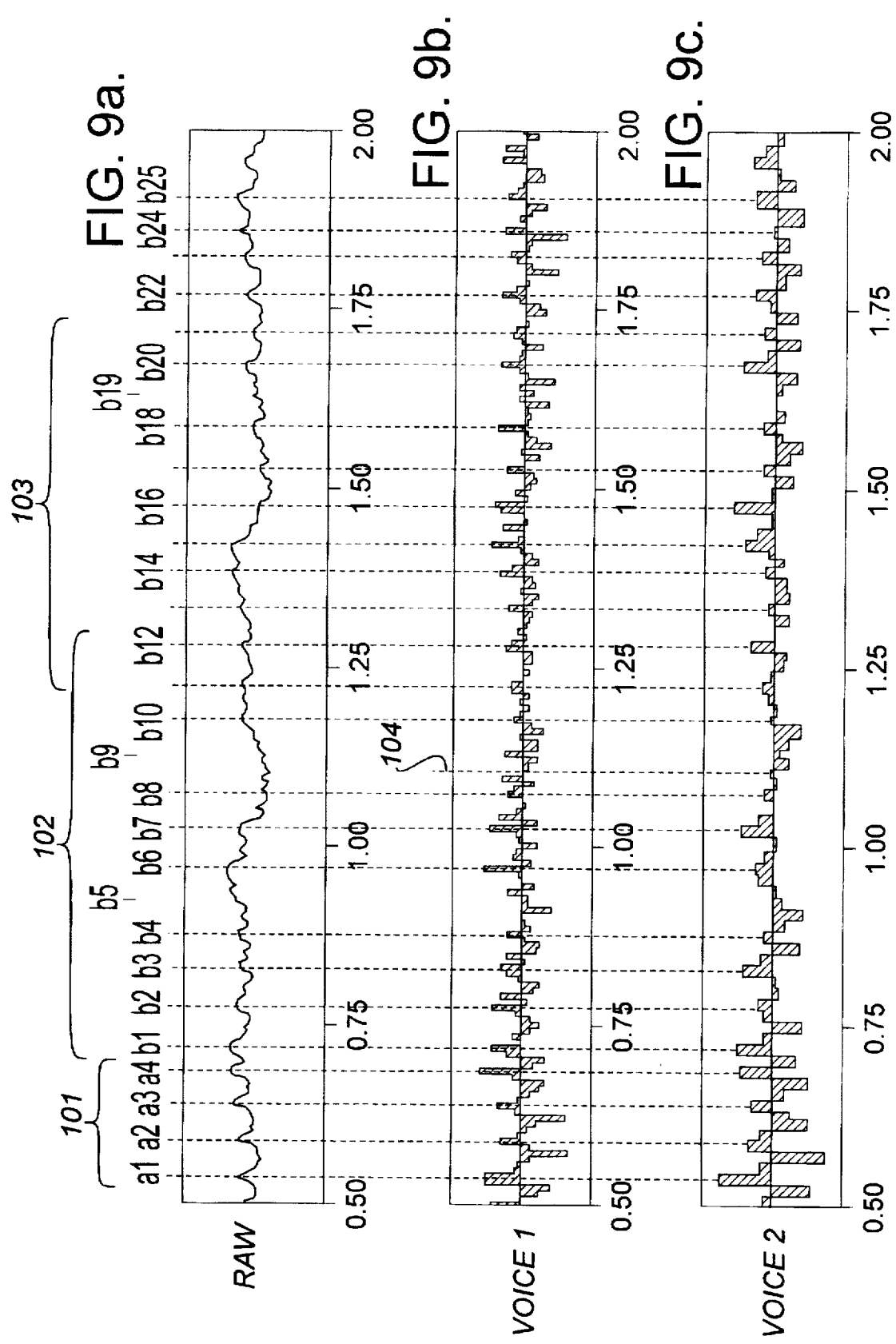

WELL COLLAR IDENTIFICATION METHOD

FIELD OF THE INVENTION

The present invention relates generally to the field of interpreting acoustic pulse data from a wellbore, and more particularly, to a method of processing the data using Wavelet Transforms for counting tubing collars existing in the interval between the wellhead and the fluid surface.

BACKGROUND OF THE INVENTION

There are several instances in testing and operation of oil wells when one needs to establish fluid level in the well.

For example, in a pressure build-up test, one wants to ascertain the changing fluid level over time.

In another instance, it is useful to monitor fluid level in a pumping well, so as to avoid draining the well and operating a dry pump. If the fluid level can be monitored, the pump Jack drive can be controlled to avoid pumping the well dry.

"Fluid level" is a term commonly used to denote the elevation of the top surface or interface of a liquid fluid column in the well.

A well will commonly comprise concentric, spaced apart, outer and inner strings of casing and tubing. The strings extend down the wellbore of the well. A wellhead is connected with these strings at their upper ends. An annular space is formed between the two strings. Each string is formed of joints threaded together end-to-end. In the case of the tubing string, two joints are joined by a "collar". This collar has a greater diameter than the tubing joints which it connects, with the result that the cross-sectional area of the annular space changes at the collar.

After a well is drilled, cased and perforated, a pump is lowered on the tubing string to the desired depth. A tally of the lengths of the tubing joints is recorded. If no tubing tally is available, the number of tubing string collars, present between the wellhead and the downhole pump, may be counted by running an inductive instrument through the string. The resultant collar count becomes the depth reference used by subsequent operators of the well.

In a producing well, the fluid level can be dynamic. As previously stated, there is a need to determine the fluid level without substantially interfering with the production. This has been traditionally accomplished using a method involving sending an acoustic pulse down the annular space between the tubing and casing strings and then detecting and recording any reflections. The reflections occur when the acoustic pulse encounters a variation in the cross-sectional area of the annular space. Reflections include those which are produced by tubing collars.

Ritzmann, in U.S. Pat. No. 2,232,476, discloses a basic methodology, wherein a high frequency acoustic pulse is projected down the annular space. Reflections are interpreted as corresponding to cross-sectional variations, arising from the presence of tubing collars, or the fluid surface itself. A plurality of reflections are recorded as an analog trace on a strip-chart recorder. A skilled human interpreter can usually distinguish collar reflections from noise and also determine the point at which the pulse reflected from the fluid interface (the "kick").

Unfortunately, merely timing the travel time of the reflection from the kick is an unsatisfactory means of determining the fluid level. This is due to variability in the velocity of sound in the gas above the fluid.

A less direct but more reliable process involves counting the number of collars to the kick. Then the location of the fluid level can be determined and related to the depth of the known location of the pump (in number of collars).

With the advent of digital signal processing techniques, several improvements have been proposed in an attempt to supplant the manual analytical collar counting approach. In general, acoustic pulse reflections are recorded as a signal and stored electronically for digital processing to identify collars, thus reducing the error prone human element.

U.S. Pat. Nos. 4,318,298, issued to Godbey, 4,793,178, issued to Ahern and 5,200,894, issued to McCoy are representative of the prior art involving digital signal processing in this technology. Generally, these references teach locating the fluid interface by:

generating acoustic pulses in the annulus between a tubing string and wellbore casing;

receiving acoustic reflections from the fluid level and tubing collars as return signals;

digitizing the return signals; and processing the digital signals to locate the fluid surface.

Each of the aforementioned prior art references treat the processing of the signals in a different manner.

More particularly, Godbey performs an acoustic velocity calibration procedure by pumping the well dry and obtaining an acoustic pulse reading from the fluid surface at the known pump depth. Alternately, Godbey examines the timing of the pulse between two collars somewhere near the well midpoint, assumes the collar spacing, and applies the velocity as an average for the well. The average velocity is then used to calculate fluid level depth in subsequent testing. The velocity estimate assumes the gas density found at the well mid-point is consistent throughout and that the well temperature varies linearly with depth.

Ahern teaches estimating the acoustic velocity by timing the interval between reflections for a pair of collars of known spacing (from a known tubing tally). Further, preselected criteria for pulse peak magnitude and widths is applied to identify the kick. In the event a tubing tally is not available, Ahern assumes tubing lengths and employs a velocity estimate to calculate fluid depth. Further, Ahern estimates the data for the first 400 feet of well, having muted that portion of the signal, to avoid any high magnitude peaks and noise resulting from the initiation of the acoustic pulse.

Often however, a tubing tally is not available and all that is known is the number of collars down to the installed downhole pump.

McCoy concentrates on determining the frequency of the reflections and identifying periodic reflections as collars. McCoy processes the stored digitized signal by initially performing passband filtering for trimming out non-periodic reflections deemed unlikely to be collars. Ultimately, this Fourier Transform-based technique produces a periodic signal, the peaks of which are interpreted as collar reflections.

Fourier Transforms are widely and successfully used for describing the features of signals which are not strongly time dependent. As applied by McCoy, the technique relies upon the substantially time-independent, periodic recurrence of uniform tubing lengths and assumes a constant velocity for sound within the annulus. The use of finite impulse response (FIR) and infinite impulse response (IIR) filters, derived from Fourier Transform analyses, effectively average any reflections which appear at a greater than expected frequency, blurring them into the next reflection. The signal is transformed from the time domain into the frequency domain to establish the frequency of reflections. Then the signal is transformed back into the time domain. The form of the transformed signal is characteristically like a sine wave wherein each peak is represented as being equivalent to a collar. However, Fourier Transform techniques are not so appropriate when the signal is time variable, as is the case with variable collar spacings and the time therebetween. The limitations of a Short Time Fourier Transform technique, when the signal characteristics are strongly time dependant, are described in the paper, *Related Positive Time-Frequency Energy Distributions*, by Dorize, C. and Gram-Hansen, K., Wavelets and Applications, Meyer, Y., Ed., Proceedings of the Int'l Conf., Marseille, France, May, 1989.

Factors which limit the effectiveness of the Fourier Transform approach include non-uniformity of timing between the resultant reflections due in part to the occasional use of shorter interconnecting pup-joints or the presence of anchors. If one assumes typically 30 foot lengths, inclusion of a single 15 foot pup-joint can immediately result in an error of one joint.

Further, the resultant periodic signal is relatively devoid of characteristics which would enable it to be distinguished as a collar coated in wax build-up or an anchor.

In summary, the prior art techniques of Ahern and Godbey rely on previously known tubing tallies and estimates of the acoustic velocity. McCoy relies upon the relatively regular recurrence of collar reflections.

More specifically, the difficulties incurred using the above systems are:

that structural variations contributing to the reflections may not be known—for instance, the tubing may not all be the same length and there may be one or more intermediate tubing lengths of atypical length;

that the velocity of sound can vary significantly along the depth of the wellbore (due to variable gas density and temperature), making estimates of length from reflection timing uncertain;

that reflections received are not necessarily from tubing collars alone but may be due to wax build-up, anchors, pump noise or other interferences;

that reflections may be masked by smoothing wax build-ups or by noise; and that the reflections from the tubing collars near the top of the well can be initially drowned out by the overwhelming, initial acoustic pulse.

As a result, a still significant portion of the industry presently refuses to use digital fluid level devices because the results do not agree with the trusted analog methods and human analysis.

SUMMARY OF THE INVENTION

Unlike the application of a periodic-type filter, such as a Fourier Transform, which effectively averages non-periodic or transient reflections and normalizes features which enable characterization of non-collar interferences, the present invention permits processing of the signal while retaining both time and amplitude characteristics.

The present invention relates to an improved method of processing digitized acoustic reflection data for extracting reflections which more dependably represent collars and the fluid surface. The method comprises first obtaining acoustic pulse data from a well, then digitizing and storing the amplitude-versus-time signal for subsequent processing. The processing step is based upon the application of wavelet transformations to the signal.

In a broad aspect, a method is provided for counting collars associated with a tubing string, said tubing string extending downwardly from a wellhead into a casing string in a wellbore, said strings forming an annular space between them, said annular space containing a column of liquid fluid having a fluid level, comprising:

sending acoustic pulses down the annular space, detecting acoustic pulse reflections produced when each pulse contacts surfaces formed by variations in cross-sectional area of the annular space, and producing electrical signals indicative of the reflections;

digitizing the electric signals;

storing each signal as time and amplitude components;

processing the signals by applying a wavelet transform thereto to produce multiple resolutions of each signal, preferably four, at least one resolution of which has a transformed signal resolution sufficient to distinguish reflections emanating from collars (collar-resolution), at least one other resolution of which has a coarser resolution than said one resolution, said other resolution having a transformed signal resolution sufficient to distinguish reflections emanating from the fluid surface as kicks and repeat kicks (kick-resolution);

locating the kick and repeat kicks by seeking reflection maximums at the kick-resolution which qualify as singularities, when synchronized against successively finer resolutions, preferably identified as being either the sole maximum or being a significant maximum as compared to adjacent maxima;

counting reflection maximums, at the collar-resolution, present in the interval between the wellhead and the fluid level; and reporting the depth of the fluid level measured in terms of the total number of collars counted.

In another aspect, a method for automatic fluid level control is provided comprising accepting a set-point from an operator, triggering an acoustic pulse automatically, determining the fluid level using the above Wavelet Transform method, and controlling the pumping of fluid from the well.

BRIEF DESCRIPTION OF THE DRAWINGS

FIG. 1a is a cross-sectional view of a conventional well having a tubing string, casing string, a downhole pump and a fluid column having a fluid surface;

FIG. 1b is a fanciful depiction of a raw reflection signal from an acoustic pulse test. The signal is shown associated with a pictorial representation of reflections from the wellbore of FIG. 1a.

FIGS. 4a, 4b, 4c, 4d and 4e demonstrate wavelet transform processing of a portion of the raw signal of FIG. 2, and four resolutions or voices of the signal obtained using wavelet decomposition;

Figure 2:
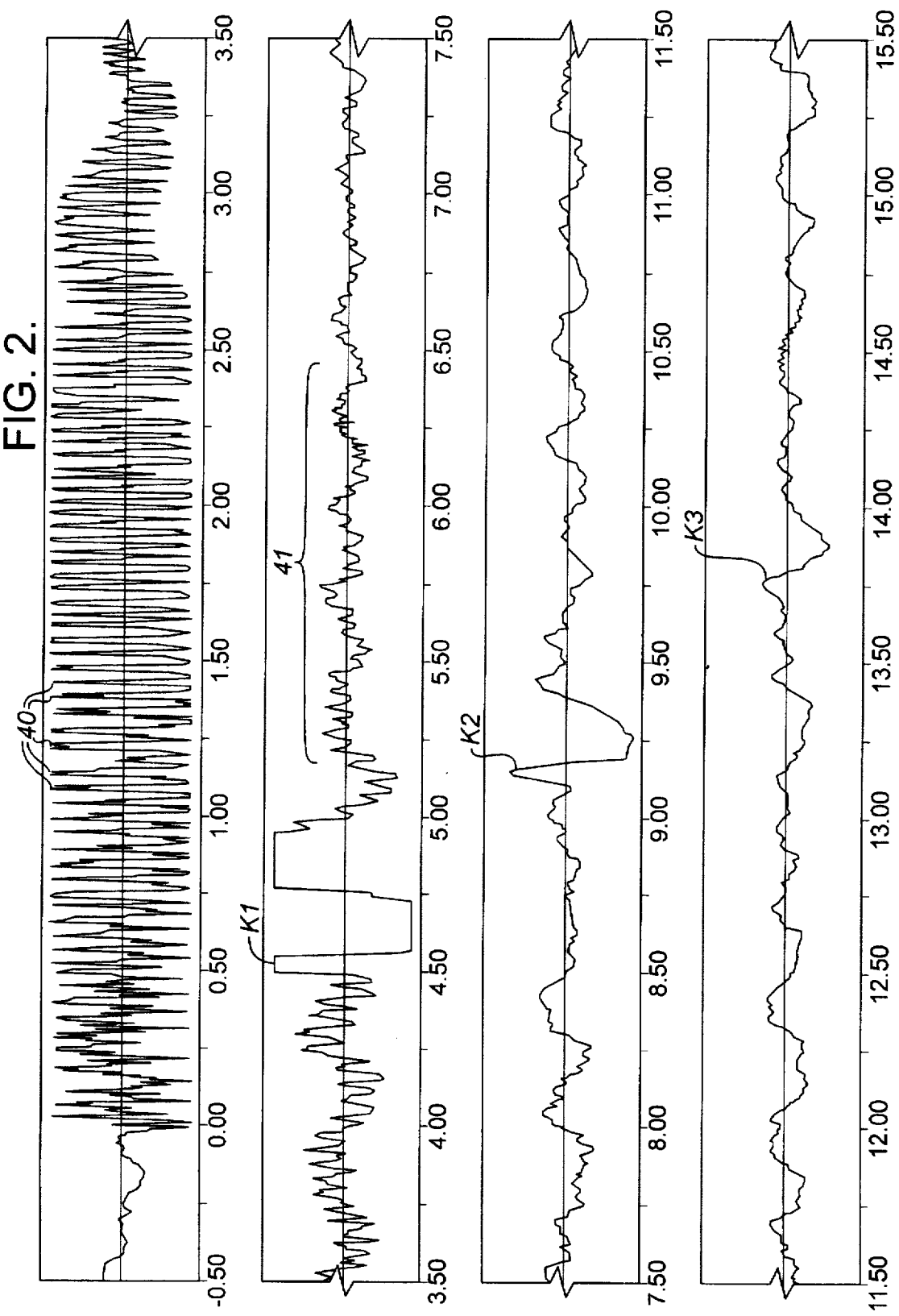
FIG. 2 is an actual unconditioned raw signal from an acoustic pulse test, showing the reflections traced from the original pulse generated at the wellhead, down to the fluid's surface, and then through two more cycles of the pulse returning to the wellhead and down again to the fluid's surface.
Figure 5:
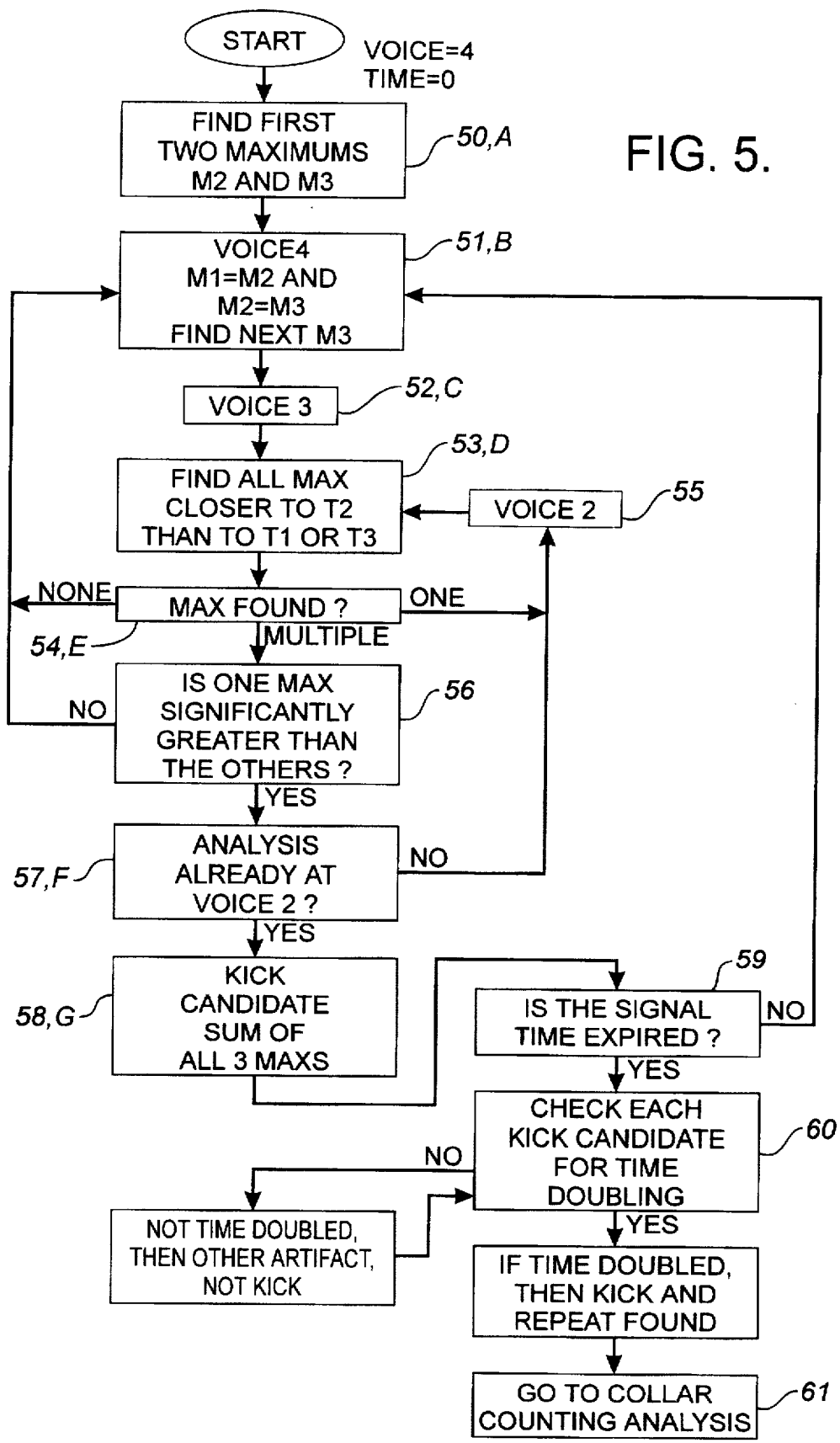
Figure 7:
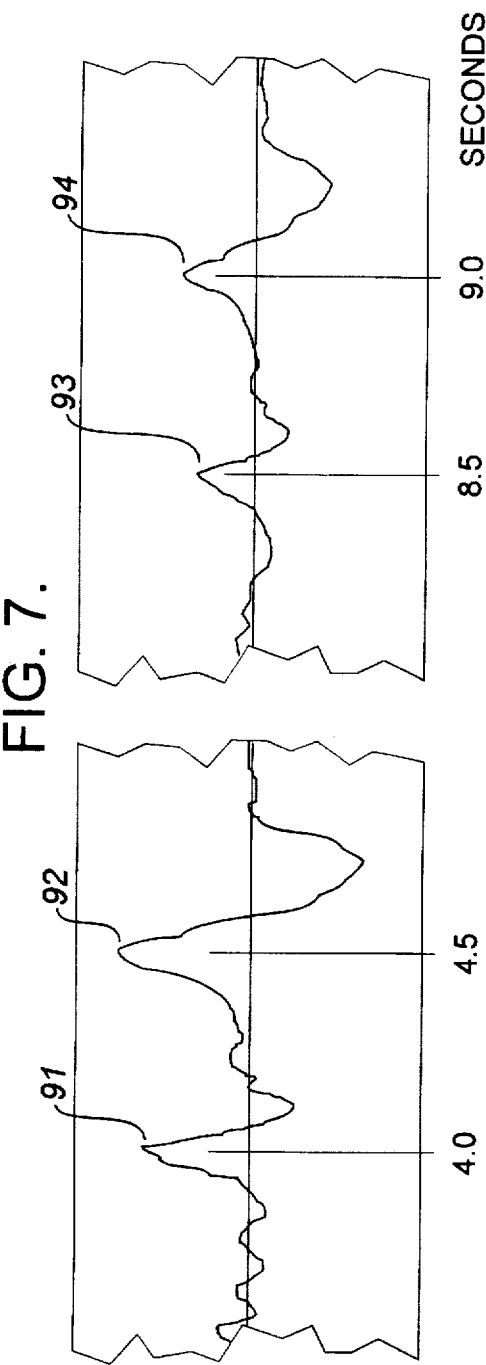
Figure 8:
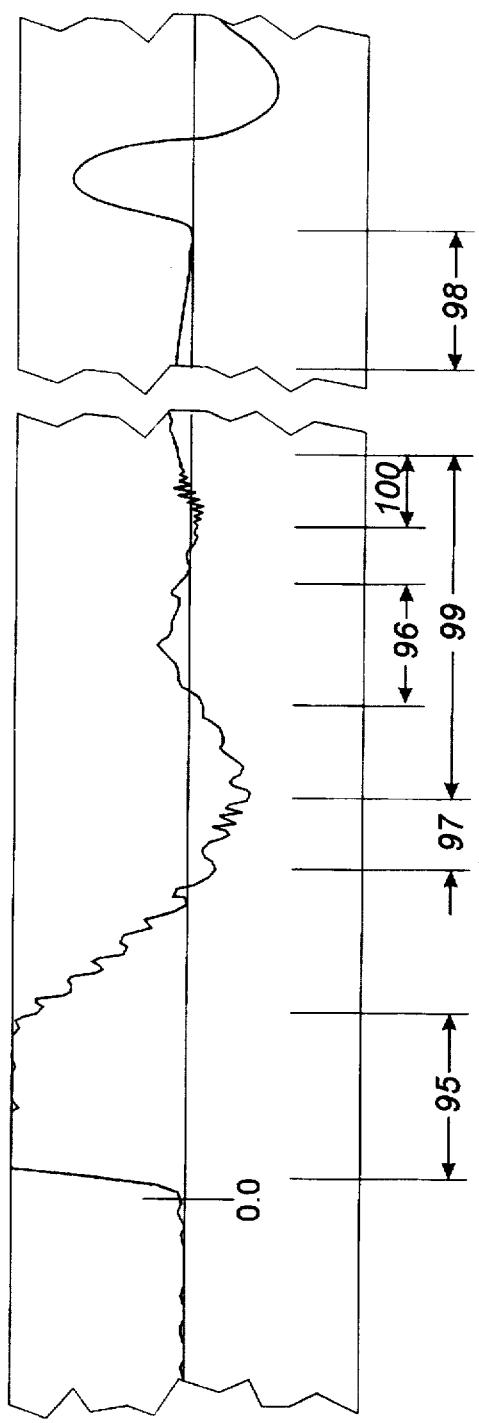

More specifically:

FIG. 4a is a portion of the signal of FIG. 2, showing some of the reflections obtained from the interval between the wellhead and the fluid surface;

FIG. 4b represents the finest resolution, or voice 1, of the signal of FIG. 4a;

FIG. 4c represents the next coarsest resolution, or voice 2, of the signal of FIG. 4a, the coarsest level at which collars are determined;

FIG. 4d represents the next coarsest resolution, or voice 3, of the signal of FIG. 4a;

FIG. 4e represents the coarsest resolution, or voice 4, applied to the signal of FIG. 2, the coarsest level at which the fluid surface or kick is determined;

FIG. 5 illustrates a flow chart of the steps used to extract the kick from the signal using voices 4 through 2;

FIGS. 6a–6d are a portion of the raw signal of FIG. 2, applying the steps of FIG. 5 for the determination of location of the kick;

FIG. 7 is a fanciful depiction of an acoustic pulse test where a strong reflection source is located adjacent and upstream of the fluid surface;

FIG. 8 is a fanciful depiction of an acoustic pulse test where the raw signal is subject to a number of problems; and FIGS. 9a through 9c are a raw signal and voices 1 and 2 applied for the purposes of obtaining the collar count;

More specifically:

FIG. 9a is a raw reflection signal containing an atypical tubing length and ambiguous collar data;

FIG. 9b depicts the finest resolution used, being voice 1.

FIG. 9b depicts the collar-resolution, or voice 2, from which maximums are selected for the determination of the number of collars.

DETAILED DESCRIPTION OF THE PREFERRED EMBODIMENT

Having reference to FIG. 1a, a conventional well A is shown comprising a wellhead 1, casing string 2, and a reciprocating rod string 4 extending downwardly inside the bore 9 of a tubing string 3 to a downhole pump 5. The casing string 2 is perforated adjacent its bottom end at 6, for permitting reservoir fluid to flow into the annular space (annulus) 8 formed between the casing string 2 and the tubing string 3. The pump 5 is positioned adjacent the perforations for receiving reservoir fluid from the annulus 8 and lifting it to the surface through the tubing string 3.

The tubing string 3 itself comprises a plurality of discrete lengths or joints 10 of tubing, connected together by collars 11. Predominantly, the tubing string 3 comprises a plurality of nominal 30 foot joints. Atypical lengths occasionally appear for a variety of reasons. For example, during a temporary discontinuance of running in tubing, the crew may insert a short 15 foot piece of tubing ("pup joint" 12) to enable finishing sooner. Additionally, a pup joint is often connected to the pump to facilitate easier handling of the tubing and pump at the surface and is used at the top of the tubing string to more precisely locate the elevation of the downhole pump.

From either an original tubing tally or inductive testing, the depth of the pump is known by the number of tubing collars between the surface and the pump. In combination with the acoustic pulse results, the well's collar count is typically used by an operator as their point of reference to establish the relative position of the fluid level in the annulus with respect to the pump.

Determination of the level of fluid in the well is initiated by performing a conventional acoustic pulse test on the well. As is well known in the prior art, an acoustic pulse is generated, at the wellhead, by triggering a valve 14, releasing some gas from a compressed gas source 13 and introducing a sharp release of gas into the annulus. The pulse propagates downhole as a acoustic wave. This overall operation is herein termed "sending acoustic pulses down the annulus".

At each variation of the cross-section of the annulus, a reflection is produced. The reflection manifests as a change in the sound, detected at the wellhead by a microphone 15. The microphone converts the reflections into an electrical signal 16. The timing of the receipt of each reflection is dependent upon the distance of the variation from the microphone and the temperature and density of the medium extending throughout the annulus between the variation and the microphone.

Reflections are induced by obstructions or constrictions in the annulus area, located along the length of the annulus, including constrictions occasioned by the tubing string and the fluid's surface. In particular, the female end of each joint of tubing is upset, having a larger diameter than the corresponding mating male end. Therefore, each tubing collar forms a localized constriction of the annulus and causes a reflection; Reflections are also received from anchors, waxy build-ups and the like, and may include some background electrical "noise".

As seen from FIG. 1b, a fanciful representation of an acoustic pulse test is presented to demonstrate the basic elements. Lines 20 represent the acoustic pulse progressing downhole and lines 21 represent reflections from collars 11 and fluid surface 22. Reflections 21 appear as spikes 23 on the strip chart 24. A large reflection, or kick 25a, is typical of the pulse reaching the fluid surface 22. Note that the strip chart 24 is only able to display reflection information after each reflection 21 returns to the wellhead 1. Accordingly, if the acoustic pulse required 2.25 seconds to travel to the fluid 22, the strip chart displays the reflection 21 at an elapsed time twice that, or at about 4.5 seconds. A second kick 25b is shown at the trailing end of the usefulness of the test, also demonstrating that collar reflections are no longer discernable.

As the pulse travels down and up and down in the annulus, its energy dissipates. The amplitude of each reflection 21 successively diminishes over time. In some wells, the collar reflections 11 can even die out prior to the first kick 25a, complicating the analysis. Depending upon physical conditions present in the well and the energy of the acoustic pulse, second and third reflected repeats of the kick may be detected.

Having reference to FIG. 2, a raw microphone signal is shown. The acoustic pulse is initiated at 0.00 seconds and the resulting reflections are shown to be strong and fairly well defined. Reflections 40 are quite readily interpreted as collars. Once the energy level dies down a bit, a sinusoidal pattern 41 shows, which is likely the cyclical pump noise from the pump jack. A first kick K1 is found at about 4.6 seconds. The first repeat kick K2 is detectable at 9.2 seconds and even a third K3 at 13.8 seconds, each being characteristically separated by an equivalent time interval, here being 4.6 seconds.

Figure 3:
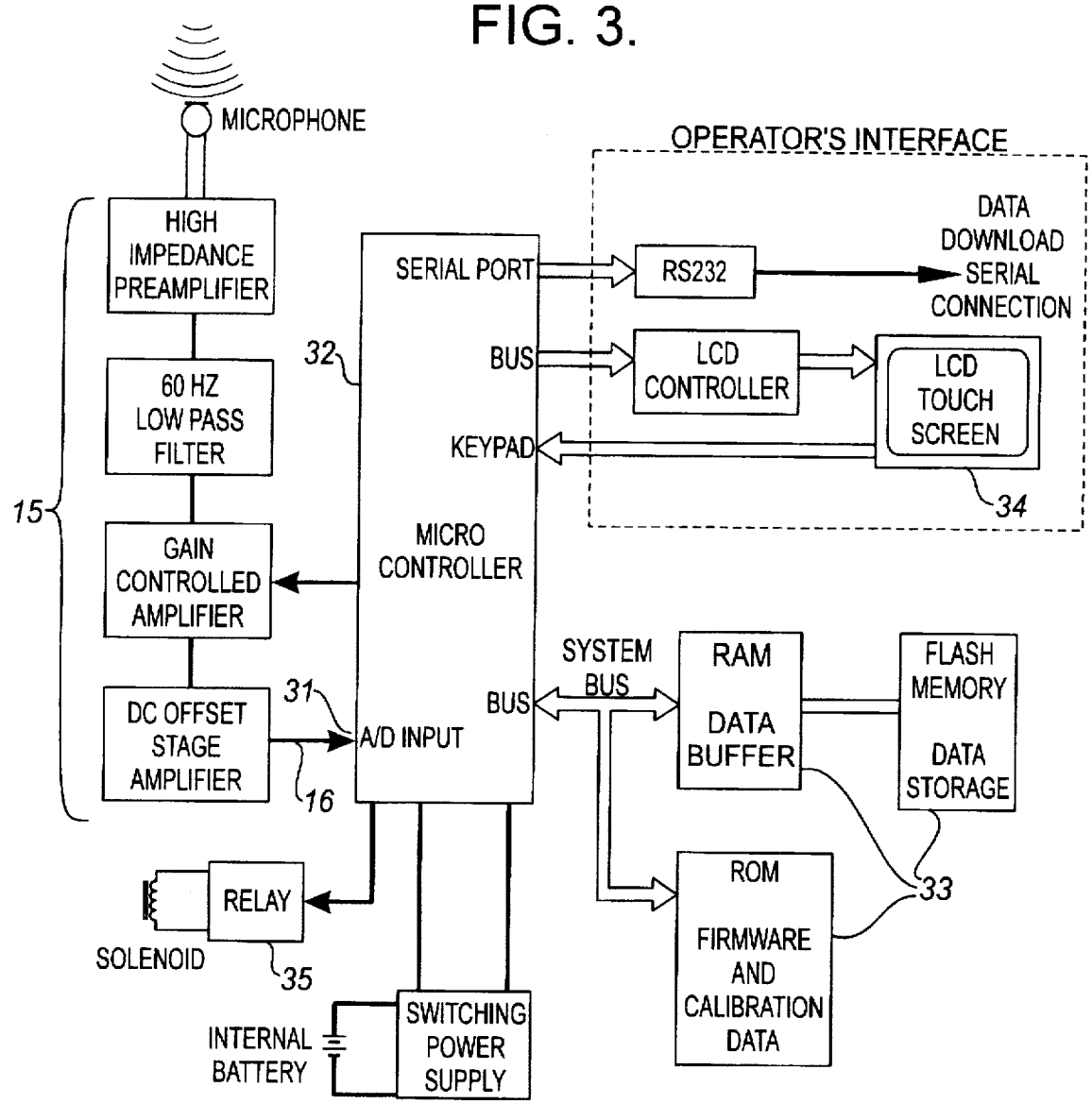
FIG. 3 is a block diagram of the means used to process the digital signal.

As shown in the block diagram of FIG. 3, apparatus 30 is provided for implementing the method of the invention. The apparatus 30 comprises acoustic reflection signal conversion, analysis, storage and control interfaces. The microphone 15 receives the signal 16 and delivers it via an analog to digital conversion 31 into a microprocessor 32. The digital signal 16 is stored in a data buffer 33 for subsequent analysis as described below. The apparatus 30 further comprises operator interface 34, and an control interface 35 for acoustic pulse initiation.

The present invention is directed toward examination of each discrete reflection to determine its character. Generally, this involves applying a Wavelet Transform or decomposition-type technique for more clearly identifying events of significance, discarding those which are non-significant, and labelling the significant events as kicks or collars.

The use of Wavelet decomposition is currently being used to great advantage in the technologies of compressing digital image and analysis of speech waveforms. This approach is well understood as a means for signal processing as described in a pioneering reference "Orthonormal Bases If Compactly Supported Wavelets," Comm. Pure Appl. Math., Vol. 41, 1988, pp 906–966 by Ingrid Daubechies and more recently in IEEE Transactions on Pattern Analysis and Machine Intelligence, Vol 11, No. 7, pp.674–693, July, 1989 as described in "A Theory for Multiresolution Signal Decomposition: The Wavelet Representation", by Stephane Mallat. As described as background above, Dorize and Gram-Hansen describe the advantages of Wavelet Transforms over Fourier Transforms when analyzing signals which vary in the time domain.

Wavelet Transforms are better suited for identifying data which include sharp time domain discontinuities than are Fourier transform-based filters. The inclusion of a pup-joint in an otherwise regular, periodic set of reflections would appear in the signal as a discontinuity or transient. Wavelet Transform analysis preserves the transients whereas a Fourier Transform analysis averages or eliminates them.

Typically, to apply Wavelet decomposition, one chooses an appropriate orthogonal analyzing Wavelet Transform.

$$S(b,a) = \sqrt{a} \int s(t) \psi \left( \frac{t-b}{a} \right) dt$$

where s(t) is the reflection signal;

t is time;

$\psi$ is the basic analyzing wavelet, which is translated in time, then is dilated or contracted using a;

a is the scale parameter or resolution; and b is the time

The well known "Dyadic" discrete Wavelet Transform is particularly suited as a digital technique for analyzing the tubing collar reflection signals. A cubic spline is a good choice as the analyzing wavelet $\psi$ due to its good maxima detecting and enhancing properties.

The Dyadic Wavelet Transform splits the signal into smoothing and details information. Each successive transformation, or voice, furthers splits the signal, the resolution becoming more and more coarse, attenuating the amplitude and broadening the time domain. Transformations are performed only as necessary to clearly separate what may be discerned as valid reflections and what may be non-significant. This is related to the rate of data sampling. If the original data is sampled at 256 samples/second or 1 sample every 0.004 seconds, then a first transformation results in data at every 0.008 seconds (twice the coarseness or ½ the resolution).

As each voice of the Wavelet Transform provides a view of the signal at half the resolution of the resolution of the voice above it, significant or large events are naturally expected to be more readily identified at coarser voices. The kick is an event characterized by a much larger reflection than the others, as it represents the end or boundary of the well's annular chamber.

Accordingly, and having reference to FIG. 4a, a portion of the acoustic reflections from FIG. 2 are shown as a variable raw electrical signal 16 with respect to time, in seconds. The signal 16 is subjected to four levels of Wavelet transformation or decomposition, voices 1 through 4, the results of which are shown in FIGS. 4b through 4e respectively. This is readily observed as reduced amount of detail as one views FIGS. 4a, then 4b through to 4e. Each transformation further coarsens the data, depicted numerically in Table 1 (shown below). The reflections emanating from tubing collars, having a narrow signal width, would be most readily located at around the 0.015 to 0.032 sec. resolution. Kicks, being bigger events (more expansive in time) are still distinguishable at the 0.064 second level. Therefore, dependent upon the initial signal sampling rate, fewer or additional transformations are needed.

TABLE 1

| Sampling rate | 256 | | 512 | samples/second |
|---|---|---|---|---|
| seconds/sample | 0.004 | | 0.002 | |
| voice 1 | 0.008 | | 0.004 | |
| voice 2 | 0.016 | collar | 0.008 | |
| voice 3 | 0.032 | | 0.016 | collar |
| voice 4 | 0.064 | kick | 0.032 | |
| voice 5 | 0.128 | | 0.064 | kick |

Accordingly, a candidate kick may possibly be readily discerned by eye, as being the largest peak relative to the other peaks on a coarse voice. A characteristic of the coarser resolutions is that even lesser, multiple events can become exaggerated if conjoined in voice 4. However, multi-resolution analysis, or analysis of the same event at ever finer resolutions, is subsequently applied for separating possible multiple smaller events (artifacts or closely spaced collars) from a single larger event (ie. the kick), known as "textures" and "edges" respectively in image processing.

The concept of multi-resolutional analysis, Dyadic Wavelet Transforms, and the application of the cubic spline wavelet, as applied to compressing and reconstituting images, is disclosed in great detail in the paper *Wavelet Maxima Representation*, by Stephane Mallat and Sifen Zhong, Proceedings of the Int'l Conf., Meyer, Y., Ed., Marseille, France, May, 1989.

Having reference to the flow chart of FIG. 5, a multi-resolutional analysis is performed for determining which events are candidates as representing kicks. The multi-resolution approach to locating the fluid surface basically begins by locating a triplet of maximums on the coarsest voice. The middle maximum of the triplet is then scrutinized at successively finer levels at synchronous times to ensure singularity of the maximal event, as opposed to being a collection of multiple events or an aggregate. If the event is an aggregate, the analysis is advanced to the next maximum, forming a new triplet, and the analysis starts anew.

Generally, the logical steps are as follows:

(a) at block 50, starting with voice 4, at time=0, incrementally search along the time scale and assign the first two maximums as M2 and M3, stored in array form as (A2,T2) and (A3,T3) respectively, where A2 represents the amplitude of the maximum at time T2 and T3, assigned at the centroid of the maximum;

(b) at block 51, on voice 4, increment the triplet maximum values by setting M1, stored in array form (A1,T1) as the old M2 values (A2,T2), setting a new M2=M3, and then locating the next maximum and setting it as M3;

(c) at block 52, shift the multi-resolution analysis to voice 3;

(d) at block 53, seeking all maximums which are closer to the M2 maximal time T2, than they are to either times T1 or T3;

(e) at block 54, test it the maximum M2 is a kick candidate, (i) if no maxima were found at step (d), then go to step (b, block 51) and resume looking for the kick, (ii) If one maximum was found at step (d), then it may be a kick candidate, check it at a finer resolution, go to step (f, block 55), (iii) if more than one maxima were found, then, at block 56, is the amplitude of the largest significant?

Possible tests include seeking a maximum greater than 1 standard deviation greater than the population of maximums located, or a test as simple as determining if the maximum is greater than twice the amplitude of next largest maximum;

(1) if yes then it may be a kick candidate, check it at a finer level, go to step (t, via block 55), (2) If not, then it is deemed a mere collection of lesser reflections, go to step (b, block 51) and resume looking for the kick, (f) at block 57, check the maximum at the next finer level, (i) If on voice 3, then move the multi-resolution analysis to voice 2 (block 55) and go to step (d, block 53);

(ii) otherwise the candidate has been tested at voice 2 and go to step (g, block 58); and (g) at block 58, a kick candidate has been identified, save it as such, and repeatedly return to step (b, block 51), continuing to seek kick candidates until the entire signal has been processed (block 59); and (h) at block 60, test the kick candidates so as to locate the kick and first repeat, (i) if the first kick candidate has a time value ½ that of the next kick candidate, if so then it is the kick and the analysis is done, go on to count collars, block 61;

(ii) else the kick may be an anchor, so, test for doubling of time between kick candidates and shift forward one kick to test again. The first pair which demonstrate time doubling are deemed the kick and its first repeat.

Figure 6:
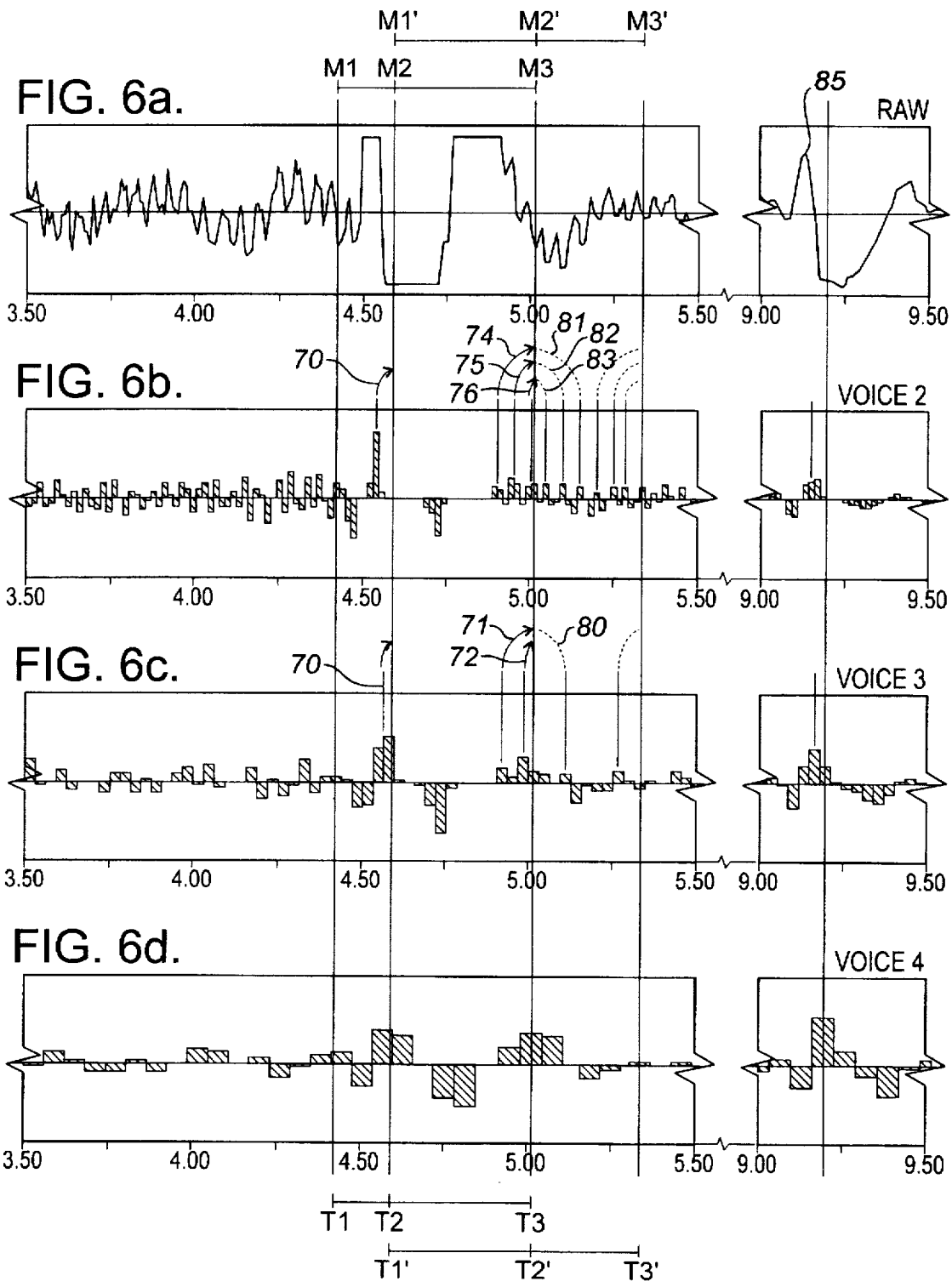

Having reference to FIGS. 6a the latter portion of a raw reflection signal is shown. Acquired at 256 samples/second during the acoustic pulse test, the Wavelet Transform is applied to produce four resolutions or voices. Voices 2, 3 and 4 are displayed as FIGS. 6b, 6c and 6d. In FIG. 6d, the coarsest resolution, at voice 4, demonstrates several maximums. Assuming the above analysis has already been repeated a plurality of times, this analysis is shown well advanced into the latter portion of the signal where three maximums M1, M2 and M3 are located on voice 4.

Thus, in accordance with step (c, 52), the maximas' times are synchronized to the finer voices, represented by the vertical solid lines. At step (d, 53), any maximums are assigned as being closest to the lines representing either T1, T2 or T3. At voice 3 on FIG. 6c, only one maximum 70 is found being closer to T2 than T1 or T3, other maximums 71 and 72 being closer to T3. This maximum 70 is deemed a likely kick candidate. Repeating the analysis again (block 53) at voice 2, only one maximum 73 is found which is closer to T2 than to T1 or T3, the others, 74, 75 and 76 being closer to T3. Now that the analysis is already at voice 2 (the collar-resolution) the discovery of only one maximum 73 clearly indicates a singularity and is thus assigned as a kick candidate (block 58).

Looping again to step (b, 51), the old triplet is advanced and new triplet values (primes) are assigned as M1'=M2, M2'=M3 and a new maximum M3' is added. When T1', T2' and T3' are synchronized to voice 3, three maximums 71, 72 and 80 are located closer to T2' than to either T1' or T3'. Also one of the maximums appears to be significantly larger than the other two (greater than twice the amplitude). Thus, step (e)(iii)(1), blocks 56 and 57 direct the analysis to voice 2, block 53.

Now at voice 2, 6 maxima 74, 75, 76, 81, 82 and 83 are found closer to T2 than they are to T1 and T3. More importantly, none of the 6 maxima stand out as being significantly greater in amplitude from the others. Thus, step (e)(iii)(2), block 56 determines that M2' on voice 4 fails to achieve kick candidate status and is merely an aggregate. Thus, the analysis swings back to voice 4 to advance the triplet and continue processing the signal.

When multiple kicks are located, the repeat kick appears at twice the original kick time. Note that the first kick here is located at about 4.5 seconds (73) and the repeat is at 9.0 seconds (84). However, should the kick candidate have actually been the reflection from an anchor, for example, say 0.5 second before the kick 73, then it will not demonstrate this time doubling.

Having reference to FIG. 7, a fanciful trace shown is presented showing two large maximums 90,91 adjacent one another and another pair of maximums 92, 93 later in time. Presuming that they have all been identified as kick candidates by the above method, the question becomes, which of the first maximum 91 or second maximum 92 is the kick? This is answered by examining the repeat maximums. Whereas the earlier maximums 91, 92 appear at 4.0 and 4.5 seconds respectively, the later 92, 93 appear at 8.5 and 9.0 seconds. Clearly, the second and fourth maximums 92, 94 demonstrate the doubling effect (9.0/4.5=2) and represent the true kick and its repeat. The first maximum 91 and third maximum 93 indicate the presence of a severe annular restriction of sorts (like an anchor), located a consistent 0.5 seconds upstream of the fluid surface kick and do not demonstrate the doubling effect (8.5/4.0=2.125)

Next, now that the fluid level has been detected, we proceed to determine the number of collars that are present between the wellhead and the kick. This is the ultimate result a well operator wants to determine.

Under ideal conditions, such as a well with good pressure and low noise, one can merely count maximums from the collar-resolution, laying between the wellhead and the kick, as being the collars.

In other cases however, and having reference to the features identified on fanciful FIG. 8:

the physical arrangement of the wellhead and test port can interfere with the initiation of the acoustic pulse, resulting in high energy, noisy aftermath washing out the initial reflections, (portion 95);

wax build-ups can attenuate the resulting reflection (portion 96), making it harder to characterize;

a short length of tubing results in a closer spacing of reflections (portion 97);

under low pressure, the energy of the acoustic pulse is quickly dissipated and the reflections may become imperceptible by the time they return from the fluid's surface (portion 98);

noise associated with the reciprocating pump can overlay a periodic signal (portion 99); and noise associated with sucker rod rubbing packing can overwhelm the reflections signal (portion 100).

Accordingly, a process is applied to the collar-resolution which, in some senses, synthesizes human analysis and in other senses enhances it.

Generally, referring to the maxima on the collar-resolution, the median of the spacing (timing) between each maximum of a group of adjacent maxima is calculated.

If the median spacing is clearly greater that normal tubing collar spacings (say 0.1 seconds), then the method is forced to extrapolate forward, based on the collar spacings from the last group of collars. Typically this occurs when the well is at low pressure and the energy dissipates too quickly (a small puff into a large low pressure zone) to return collar reflections from the bottom of the well.

If the median spacing is "normal", then the incremental spacing is compared against the median to seek out odd spacings. If a short spacing is found, the discontinuity in median spacing is presumed to separate groups of like collar spacing. Typically, a group of 30 foot tubing joints will be separated from another group of 30 foot tubing joints by some short joint. The number of collars for that group is truncated, and a new group is started.

If the spacing is much larger than the median, then a collar is presumed to have been missed and one is placed there by interpolation. Typically this occurs if the collar peak had been damped out by wax build up.

Having reference to FIG. 9a, a portion of an actual reflection signal from a well is illustrative of several analytical problems, more particularly: one short tubing length, and a section having poor acoustic response (presumably due to wax build up smoothing out collars) which results in missed collars and collars which are substantially impossible for a human analyst to detect without help. FIGS. 9b and 9c show two levels of wavelet decomposition; voice 1 and voice 2. Voice 2 is the collar-resolution.

Applying the above counting process to the problemental signal several approaches can be taken. The first is to apply the above steps directly to the collar-resolution maximums of voice 2 and count the number of collars.

Alteratively, to ensure the singularity of the voice 2 maximums, one can first apply the multi-resolutional analysis formerly applied to voices 4, 3 and 3 for kick-candidacy determination, and apply it instead on voices 2, 1 and the raw signal for collar-candidacy determination. Once the singularity has been confirmed, the time of the corresponding maximum located on the raw signal becomes the reference time for the reflection.

Before analyzing the signal it is perhaps instructive to point out the obvious difficulties in manually analyzing this signal. First, at about 0.6 seconds, there are two peaks quits close together. Secondly, the signal between 0.85 and 1.7 seconds is relatively featureless, typical of a waxed up zone of collars, producing poor reflections.

Accordingly, by applying the multi-resolutional analysis, singularities are located on the raw signal of FIG. 9a for maximums found on voice 2. The corresponding singularities are identified in time and on FIGS. 9a through 9c, by vertical lines a1 through a4 and b1 through b25.

A first group 101 on voice 2 is selected (a1–a4, b1–b4, b6 and b7), choosing a group population of ten. The median spacing is determined. The spacing between each of a1–a2, a2–a3, a3–a4 is nearly the same as the median, but the spacing between a4 and b1 is about ½ that of the median and thus is considered a discontinuity. Consequently, this group of 10 is truncated to 4.

A new group 102 is started at the next occurring maximum b1. Ten more maximums are selected (b1–b4, b6–b12) and its median spacing is calculated. Each spacing is checked. From b1 to b4, the spacing is nearly that of the median. This is easily confirmed visually from the Figures. However, between b4 and b5 and b8 and b10, the spacing is nearly 1.5 times that of the median. First, a collar b6 is interpolated and placed between b5 and b7. Maximum b12 is discarded from the group so as to maintain the original group population of 10. The remaining spacings are compared to the median. Maximums b6 through b8 appear to be regular, but the bB to b10 spacing is nearly 1.5 times the median. Another collar b9 is interpolated and placed between b8 and b10. Maximum b11 is discarded to maintain group 102 at a population of 10.

Note at about 1.1 seconds, a very minor maximum 104 at voice 2, results in finding two substantially uniform maximums when synchronized to voice 1. Thus, per the multi-resolutional analysis as applied to the kick-candidates above, this maximum is not characterized as a singularity. Thus b9 and similarly for the other gaps, collars are inserted by interpolation from those that could be determined.

New group 103 starts at maximum b11. As before, medians are calculated and spacings compared. New collar b19 is inserted and the group contracted to b20.

Maximums b21 and upwards are once again easily visualized, identified and counted.

Each group's resulting population, original or truncated, is summed up to the time the kick is determined to occur and consequently becomes the collar count. Any fractional time remaining between the last collar located and the kick can be counted as a fraction of a collar so as to reduce the potential error for situations where a tubing length is partially submerged in fluid.

In an actual well test, the well operator provided the following information; the number of joints to the pump= 228. Using the method of the invention, the fluid level was calculated at 184 joints.

This puts the fluid at 44 joints above the pump. Normally this is all the information that an operator would want. However, using the operator's average joint length obtained from the bore hole logs, of 31.1 feet, the fluid column above the pump can be estimated as 44×31.1=1368.4 feet.

The process whereby the original acoustic reflection signal is Wavelet Transformed into multiple resolutions lends itself to other forms of post transformation analysis for the counting of collars.

In an alternate embodiment, a fuzzy inference analysis may be implemented for determination of collar reflections. Fuzzy logic is used in many applications for computer control of complex decision-making processes, and has its roots in an original paper "Fuzzy Sets", Information and Control, Vol. 8, pp. 338–353 published in 1965 by Dr. Lotfi Zadeh of the University of California, Fuzzy inference or logic involves applying a set of rules to the collar candidates. For the purposes of counting collars, fuzzy inference rules are applied to the maximums determined at the collar-resolution of the wavelet transformed signal. A range of truth values are assigned to the collar candidates so as to place them somewhere between such absolute statements like "this candidate is a collar reflection" and "this candidate is clearly not a collar reflection".

Finally, using the methods described above, means now exist for competently and automatically controlling the fluid level in the well. An operator selects a desired fluid level set-point with respect to the pump location. By periodically generating an acoustic pulse, and analyzing the reflections as described above, the collar count to the fluid surface is determined. The differential between the set-point and the actual level may now be determined. Accordingly, apparatus incorporating means for carrying out the method of the invention may also actuate means for controlling the speed of a pump or the on and off status of the pump for varying the fluid level. Typically, the microprocessor which carries out the signal transformation, kick and collar determinations, can also trigger acoustic pulse generation and incorporate a process controller or relay switching interfaces for liquid level control.

The apparatus can also permit automatic well response testing by periodically and automatically triggering acoustic pulse generation, according to the specific nature of the operation, and then performing the fluid level determination. This is particularly useful for pressure build-up tests, where frequent liquid levels are desirable early in the test and less frequently later in the test.

The embodiments of the invention in which an exclusive property or privilege is claimed are defined as follows:

1. A method for counting collars associated with a tubing string extending from a wellhead into a casing string in a wellbore, said strings forming an annular space between them, said annular space containing a column of fluid having a fluid level, comprising:

sending acoustic pulses down the annular space, detecting acoustic pulse reflections produced when each pulse contacts surfaces formed by variations in cross-sectional area of the annular space, and producing electrical signals indicative of the reflections;

digitizing the electrical signals;

storing each signal;

processing the signals by applying a Wavelet Transform thereto to produce multiple resolutions of each signal, at least one resolution, the collar-resolution, of which has a transformed signal resolution sufficient to distinguish reflections emanating from collars, at least one other resolution, the kick-resolution, of which has a coarser resolution than said one resolution, said kick-resolution having a transformed signal resolution sufficient to distinguish reflections emanating from the fluid surface as kicks and repeat kicks;

locating the kick and repeat kicks by seeking reflection maximums at the kick-resolution which qualify as singularities when synchronized against successively finer resolutions;

counting reflection maximums, at the collar-resolution present in the interval between the wellhead and the fluid level kick; and reporting the depth of the fluid level measured in terms of the total number of collars counted.

2. The method as recited in claim 1 wherein the location of the kick is established by:

(a) seeking reflection maximums at the kick-resolution and testing each kick-maximum, which is found in turn, for singularity by;

(b) counting the number of reflection maximums which may found to appear on the next finer resolution which are closer in time to the kick-maximum than they are to the immediately preceding or to the immediately succeeding maximum found at the kick-resolution;

(c) returning to step (a) and seeking the next successive kick-maximum should no closer maximums be found, the kick-maximum of interest not qualifying as a kick candidate, else advancing to the next step;

(d) comparing the closer maximums found so as to distinguish whether one maximum stands out as a significant reflection or is instead a mere aggregate of lesser, substantially uniform reflections, and if one maximum is significant, advancing to step (e), but if a mere aggregate, repeating step (a); and (e) repeating step (b) at the next finer resolution unless the current resolution being processed is the collar-resolution, for then the kick-maximum is assigned as the kick.

3. The method as recited in claim 2 wherein the relative significance of maximums in the maxima comparison step (f) is determined by:

identifying one maximum which has an amplitude greater than twice the next greater maximum.

4. The method as recited in claim 3 wherein the kick-locating steps (a) through (e) are repeated so as to identify a plurality of kick-maximums as being merely kick-candidates over time which represent the initial kick, repeat kicks and may include highly reflective annular cross-sectional variations, distinction therebetween being determined by:

comparing the times of the successive kick-candidates as referenced to the time of the initiation of the acoustic pulse, and assigning the first two kick-candidates which demonstrate locations in time which are substantially double as being the initial kick and the first repeat; and assigning any other non-periodic kick-candidates as being anomalous annular variations.

5. The method as recited in claim 2 wherein the relative significance of maximums in the maxima comparison step (f) is determined by:

identifying one maximum which has an amplitude greater than one standard deviation greater than the mean of the maxima found.

6. The method as recited in claim 1 wherein the location of the kick is established by:

(a) advancing in time along the kick-resolution and selecting the first two reflection maximums, as being a kick-maximum and a successive-maximum;

(b) advancing further and assigning a preceding-maximum as equal the kick-maximum, the kick-maximum as equal the successive-maximum, and selecting the next maximum in time and assigning it as the successive-maximum;

(c) shifting the analysis to the next finer resolution;

(d) counting the number of reflection maximums on the finer resolution which appear closer in time to the time for the kick-maximum than they are in time to the preceding maximum or to the succeeding-maximum;

(e) establishing the kick-maximum's candidacy as a kick by the number of closer maximums found as follows, returning to stop (b) to advance to the next kick-maximum, should no closer maximums be found, or returning to step (c) should only one closer maximum be found and the current resolution is not the collar-resolution, or proceeding to the next step should multiple closer-maximums be found or the current resolution be the collar-resolution; and (f) comparing closer-maxima against each other and accepting or discarding the kick-maximum as a kick as follows, returning to step (c) unless the current resolution is the collar-resolution, or should no maximum have an amplitude significantly greater than the others, then the kick-maximum is one of an aggregate and return to step (b) to seek the next kick-maximum, but should one maximum have an amplitude significantly greater than the others, then the kick-maximum is singular and is the kick.

7. The method as recited in claim 6 wherein the relative significance of maximums in the maxima comparison step (f) is determined by:

Identifying one maximum which has an amplitude greater than twice the next greater maximum.

8. The method as recited in claim 7 wherein the kick-locating steps (a) through (e) are repeated so as to identify a plurality of kick-maximums as being merely kick-candidates over time which represent the initial kick, repeat kicks and may include highly reflective annular cross-sectional variations, distinction therebetween being determined by:

comparing the times of the successive kick-candidates as referenced to the time of the initiation of the acoustic pulse, and assigning the first two kick-candidates which demonstrate locations in time which are substantially double as being the initial kick and the first repeat; and assigning any other non-periodic kick-candidates as being anomalous annular variations.

9. The method as recited in claim 8 wherein the collar count between wellhead and fluid surface is determined by starting the count from the time the acoustic pulse was generated and by:

(a) selecting a group of maxima, at the collar-resolution, having a set population size;

(b) determining the median time separation between each maximum in the group;

(c) advancing maximum by maximum within the group so long as the time therebetween is substantially the same as the median time, and if the time is about one half of the median, then include the maximum as collar, truncate the group as having a smaller population size and seek the next maximum as being the first member of a new group of maxima and repeat from step (b).

and if the time is about one and one half of the median, then insert a collar at the midpoint of the time separation, discard the last maximum from the group so as to maintain the original population size, and then continue advancing within the group; and (d) advancing the search time to the time value of the last group member and repeat from step (b) until such time as either the time of the kick is reached, or If the median time is significantly greater than the time between nominal collar spacing, then extrapolate the number of maximums that exist between the current time and the kick and make that the population size of the final group; and (e) establishing the number collars by summing the population sizes of each group until such time as the time the kick is reached.

10. A method of counting collars associated with a tubing string, said tubing string extending downwardly within the bore of the casing of a well, said collars being located between the wellhead and fluid within the well, wherein an acoustic pulse is directed into the top of the well and into the annular space between the casing and the tubing string, wherein the improved method comprises the steps of:

monitoring sound in the well, at the wellhead, for the detection of acoustic pulse reflections produced from variations in the cross-sectional area of the annular space, and producing a corresponding electric signal;

converting the electric signal into a digital signal;

storing the signal as time and amplitude components;

processing the signal by applying a wavelet transform thereto for producing four or more increasingly coarser resolutions of the signal, a least one of the resolutions having a resolution sufficiently fine for distinguishing any reflections which emanate from collars, and producing at least two further coarser resolutions, the coarsest resolution being sufficiently fine for distinguish any reflections which emanating from the fluid surface as kicks;

locating the kick by seeking reflection maximums on the kick-resolution, and testing the singularity of each maximum by correlating its location in time to other maximums appearing on sequentially finer resolutions before assigning the maximum which qualifies as singularity as a kick and those which are an aggregate as not being a kick; and counting the maximums at the collar-resolution as representing collars extending between the wellhead and the kick.

11. The method as recited in claim 10 wherein the location of the kick is established by:

(a) seeking reflection maximums at the kick-resolution and testing each kick-maximum which is found in turn, for singularity by;

(b) counting the number of reflection maximums which may found to appear on the next finer resolution which are closer in time to the kick-maximum than they are to the immediately preceding or to the immediately succeeding maximum found at the kick-resolution;

(c) returning to step (a) and seeking the next successive kick-maximum should no closer maximums be found, the kick-maximum of interest not qualifying as a kick candidate, else advancing to the next step;

(d) comparing the closer maximums found so as to distinguish whether one maximum stands out as a significant reflection or is instead a mere aggregate of lesser, substantially uniform reflections, and if one maximum is significant, advancing to step (e), but if a mere aggregate, repeating step (a); and (e) repeating step (b) at the next finer resolution unless the current resolution being processed is the collar-resolution, for then the kick-maximum is assigned as the kick.

12. The method as recited in claim 11 wherein the kick-locating steps (a) through (e) are repeated so as to identify a plurality of kick-maximums as being merely kick-candidates over time which represent the initial kick, repeat kicks and may include highly reflective annular cross-sectional variations, distinction therebetween being determined by:

comparing the times of the successive kick-candidates as referenced to the time of the initiation of the acoustic pulse, and assigning the first two kick-candidates which demonstrate locations in time which are substantially double as being the initial kick and the first repeat; and assigning any other non-periodic kick-candidates as being anomalous annular variations.

13. The method as recited in claim 12 wherein any collar reflection portion of the signal between the wellhead and initial kick, which is masked by interference, can be directly determined by:

locating a successive repeat kicks the signal following the repeat kick having sufficient energy to contain collar reflection information;

establishing a correspondence between the timing beginning at the repeat kick and the timing of the initial acoustic pulse;

locating the period of time for which the collar reflections are masked by interference;

counting the maximums at the collar-resolution for the corresponding time period and substituting the resulting collar count as representing collars that were masked in the wellhead to kick portion of the signal.

14. The method as recited in claim 13 wherein the collar count between wellhead and fluid surface is determined by starting the count from the time the acoustic pulse was generated and by:

(a) selecting a group of maxima, at the collar-resolution, having a set population size;

(b) determining the median time separation between each maximum in the group;

(c) advancing maximum by maximum within the group so long as the time therebetween is substantially the same as the median time, and if the time is about one half of the median, then include the maximum as collar, truncate the group as having a smaller population size and seek the next maximum as being the first member of a new group of maxima and repeat from step (b), and if the time is about one and one half of the median, then insert a collar at the mid-point of the time separation, discard the last maximum from the group so as to maintain the original population size, and then continue advancing within the group; and (d) advancing the search time to the time value of the last group member and repeat from step (b) until such time as either the time of the kick is reached, or if the median time is significantly greater than the time between nominal collar spacing, then extrapolate the number of maximums that exist between the current time and the kick and make that the population size of the final group; and (e) establishing the number collars by summing the population sizes of each group until such time as the time the kick is reached.

15. The method as recited in claim 14 wherein the sound is monitored at a rate of about ten times the expected reflection rate from collars.

16. A method of controlling fluid level in a well, said well having a wellhead, casing and a tubing string extending downwardly within the bore of the casing, said tubing string being assembled from a plurality of tubing lengths connected at tubing collars and having a downhole pump located at its bottom end, the collar count between the wellhead and the pump being known, the method comprising:

establishing a set point for fluid level in the well in terms of the number of collars above the pump;

periodically generating an acoustic pulse into the annular space between the casing and the tubing string at the wellhead, the period between pulses being a function of the desired objectives;

monitoring sound in the well, at the wellhead, for the detection of acoustic pulse reflections produced from variations in the cross-sectional area of the annular space, and producing a corresponding electric signal;

converting the electric signal into a digital signal;

storing the signal as time and amplitude components;

processing the signal by applying a wavelet transform thereto for producing multiple resolutions of the signal, at least one of the finer resolutions having transformed signal maximums which correspond to reflections emanating from collars, and one of the coarser resolution having transformed signal maximums which correspond to reflections emanating from the fluid surface as kicks;

locating the kick by seeking reflection maximums at the kick-resolution which qualify as singularities when synchronized against the successively finer resolutions;

counting reflection maximums at the collar-resolution extending between the wellhead and the kick;

comparing the collar count with the known collar count to the pump and relating the difference to the set point for control of the pumping of fluids from the well.

* * * * *